United States Patent [19]
Gardner et al.

[11] 3,825,073
[45] July 23, 1974

[54] SPRING CUSHION SHANK MOUNTING ASSEMBLY

[75] Inventors: Guy F. Gardner, Dearborn; Arnold C. Boyak, Jr., Detroit, both of Mich.

[73] Assignee: Massey-Ferguson Inc., Detroit, Mich.

[22] Filed: Jan. 10, 1973

[21] Appl. No.: 322,346

[52] U.S. Cl.................. 172/710, 16/190, 267/177, 172/705
[51] Int. Cl....................... A01b 15/00, A01b 35/24
[58] Field of Search ........... 172/264, 265, 705, 710, 172/706; 16/190; 267/177

[56] References Cited
UNITED STATES PATENTS

| 2,869,657 | 1/1959 | Harrop | 172/710 |
| 3,470,966 | 10/1969 | Padwick | 172/710 |
| 3,744,572 | 7/1973 | Zeltwanger et al. | 172/710 |

FOREIGN PATENTS OR APPLICATIONS

| 158,432 | 3/1953 | Australia |
| 604,945 | 9/1960 | Canada |

Primary Examiner—Robert E. Pulfrey
Assistant Examiner—Paul T. Sewell
Attorney, Agent, or Firm—Robert L. Farris

[57] ABSTRACT

A spring cushion shank mounting assembly for an earthworking tool including a bed bracket, a shank support assembly, a shank, and a spring assembly. The bed bracket, which is formed from a steel plate, includes a center section attached to an implement frame, a transversely extending depending rear flange with an aperture and two spaced depending front flanges. A shank support is positioned adjacent to the center section of the bed bracket with an arcuate rear section in contact with the transversely extending depending rear flange at each side of the aperture and an elongated guide member limited to vertical movement in the slot formed by the two spaced depending front flanges. One end of a shank passes through the aperture and is connected to the shank support. The spring assembly biases the forward end of the shank and the shank support toward the bed bracket.

1 Claim, 4 Drawing Figures

SPRING CUSHION SHANK MOUNTING ASSEMBLY

This invention relates generally to agricultural equipment and more particularly to a clamp device for resiliently clamping a shank on an implement such as a chisel plow or field cultivator.

The shank for a chisel plow should be secured to the implement frame so as to be rigidly held in position when the force exerted on the shank is less than a force which would permanently spring the shank. On the other hand, if the force exerted on the shank is approaching the maximum force allowable without permanently springing the shank, the shank mounting should allow the earthworking tool on the end of the shank to pivot up and over the obstruction exerting the force.

While it is desirable that the shank mounting allow the shank and an attached earthworking tool to pivot up and over an obstruction, it is not desirable for the shank to allow an attached earthworking tool to move sideways and around an obstruction. If the earthworking tool can move sideways, it may fail to cultivate some of the soil.

Expensive pivot pins have been used in machined apertures through shank mounting brackets to reduce movement of an earthworking tool from side to side. In addition to being expensive to manufacture, the pivot pins tend to rust and gather dirt which will increase the force required to pivot the shank up over an obstruction. In some cases, the force required to pivot the shank, due to rust and dirt, may exceed the force required to permanently bend the shank.

The spring cushion shank mounting includes a bed bracket secured to the implement frame, a shank support assembly and a spring assembly. The bed bracket, secured to the implement frame, includes a center section, a transversely extending depending rear flange with an aperture, and a pair of transversely spaced depending front flanges. The shank support assembly includes an elongated center section positioned adjacent to the lower surface of the center section of the bed bracket, an arcuate rear section in contact with the transversely extending depending rear flange at each side of the aperture, and an elongated guide member attached to the forward portion of the elongated center section. The elongated guide member of the shank support assembly is positioned between the depending front flanges to permit vertical movement of the elongated guide member and to restrict pivotal movement, about a generally fore and aft axis, to a minimum. A shank extends through an aperture in the transverse extending depending rear flange and is rigidly connected to the shank support. The forward end of the shank support is urged toward the center section of the bed bracket by a spring assembly.

An embodiment of the present invention will now be described by way of example, with reference to the drawings, in which.

Agricultural implements such as chisel plows have frames which generally consist of horizontal structural steel members. A plurality of spring steel shanks are attached to the implement frame. Earthworking tools of various types are attached to the lower end of the shank. Many of the implements have three rows of shanks located at various points to insure that all of the soil is cultivated. The space between the shanks generally depends upon the type and width of the individual earthworking tools. The shanks must be close enough together to insure that growing plants are not missed. If the earthworking tools were absolutely rigid, no overlap of the earthworking tools would be necessary. Since the earthworking tools can move from side to side, some overlap is necessary.

The shanks are attached to the frame rigidly, with a spring cushion or with a trip. A rigid connection of the shank to the frame is satisfactory where the land to be worked has no rocks or other obstructions which might damage the shanks. Where there are numerous rocks or other obstructions, a trip must be used. A trip allows the shank to be pivoted so that the earthworking tool can move up and over a large obstruction. With a trip, once a given force is applied to the shank, the shank is released to move relative to the frame due to the exertion of a relatively small force.

Where there is an occasional rock or obstruction, a spring cushion is sufficient to protect the shanks from damage. The spring cushions provide adequate protection for the shanks at considerably less cost than the spring trips.

Figure 1:
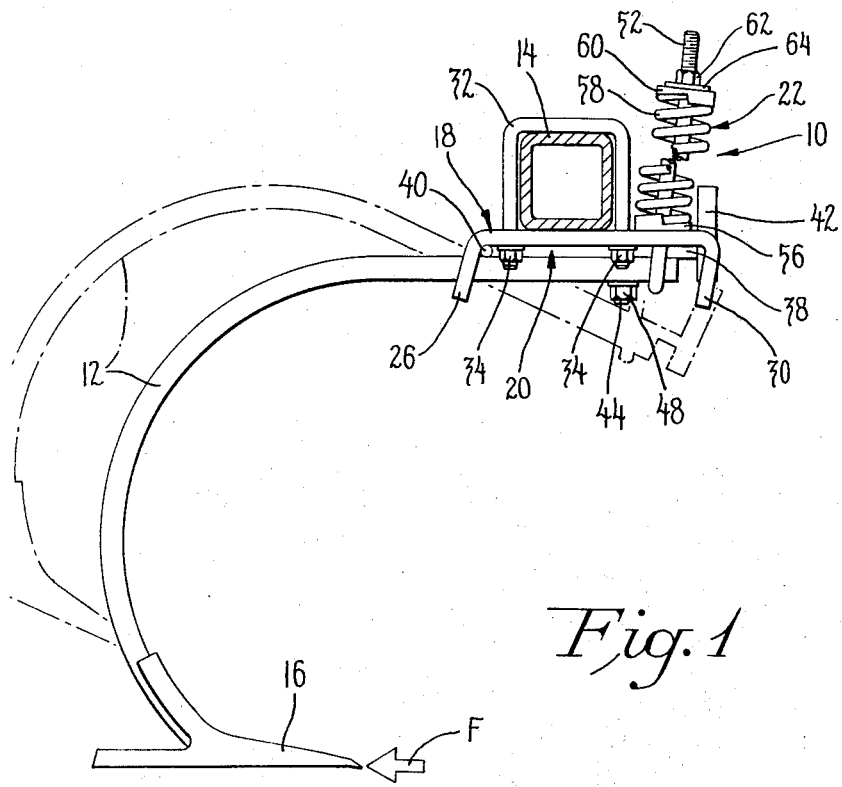
FIG. 1 is a side elevation, partly in section, of a portion of an implement having an earthworking tool mounted thereon by a spring cushion shank mounting shown in normal position in full lines and in an overloaded position, pivoted against the action of the spring assembly in broken lines.

The spring cushion shank mounting assembly 10 shown in FIG. 1 attaches the shank 12 to the frame 14 of an earthworking implement. An earthworking tool 16 is mounted on the lower end of the shank 12. The spring cushion shank mounting assembly 10 includes a bed bracket 18, a shank support 20 and a spring assembly 22.

The bed bracket 18 includes a generally horizontal center section 24. A transversely extending rear flange 26 extends down and to the rear from the generally horizontal center section 24. A rectangular aperture 28 is provided in the transversely extending depending rear flange 26. Two transversely spaced depending front flanges 30 extend down from the center section 24 of the bed bracket 18 to form a vertical slot.

The bed bracket 18 is attached to the frame 14 of an earthworking implement by two U-shaped clamps 32 and nuts 34. The bed bracket 18 may be moved laterally to different positions on the frame 14 by loosening the U-shaped clamps 32 and sliding the spring cushion shank mounting assembly 10 along the frame 14. If desired, the spring cushion shank mounting assembly 10 can be removed from the frame 14 by removing the U-shaped clamps 32. The entire bed bracket 18 is preferably formed from a flat steel plate.

The shank support assembly 20 of the spring cushion shank mounting assembly 10 has an elongated center section 38 formed from a steel plate. An arcuate rear section 40 is formed on the shank support assembly 20 by welding a piece of bar stock to the elongated center section 38. The arcuate rear section 40 of the shank support assembly 20 extends across the rectangular aperture 28 and contacts the transversely extending depending rear flange 26 to form a rear pivot.

An elongated guide 42 is welded to the forward end of the elongated center section 38 of the shank support 20. The elongated guide 42 extends across the vertical slot formed by the transversely spaced depending front flanges 30 of the bed bracket 18. This results in the elongated guide 42 being limited to substantially vertical movement relative to the bed bracket 18.

The upper end of the shank 12 extends up and forward through the rectangular aperture 28 in the bed bracket 18 and under the shank support assembly 20. The shank is attached to the elongated center section 38 by a bolt 44 that passes through holes in the shank 12 and the elongated center section 38 of the shank support assembly 36, the washer 46 and the nut 48. An aperture 50 is provided in the bed bracket 18 for the head of the bolt 44.

The spring assembly 22 includes a U-bolt 52 that passes under the shank 12 and up through slots 54 in the forward portion of the bed bracket 18. A washer 56, a compression spring 58, a washer 60 and a nut 62 is placed upon each of the upstanding legs of the U-bolt 52. A strap 64 with the upstanding legs of the U-bolt 52 extending through apertures therein is placed between the washers 60 and the nuts 62. The nuts 62 are adjusted to vary the upward force exerted on the shank 12 and the shank support assembly 20 by the spring assembly 22.

Figure 2:
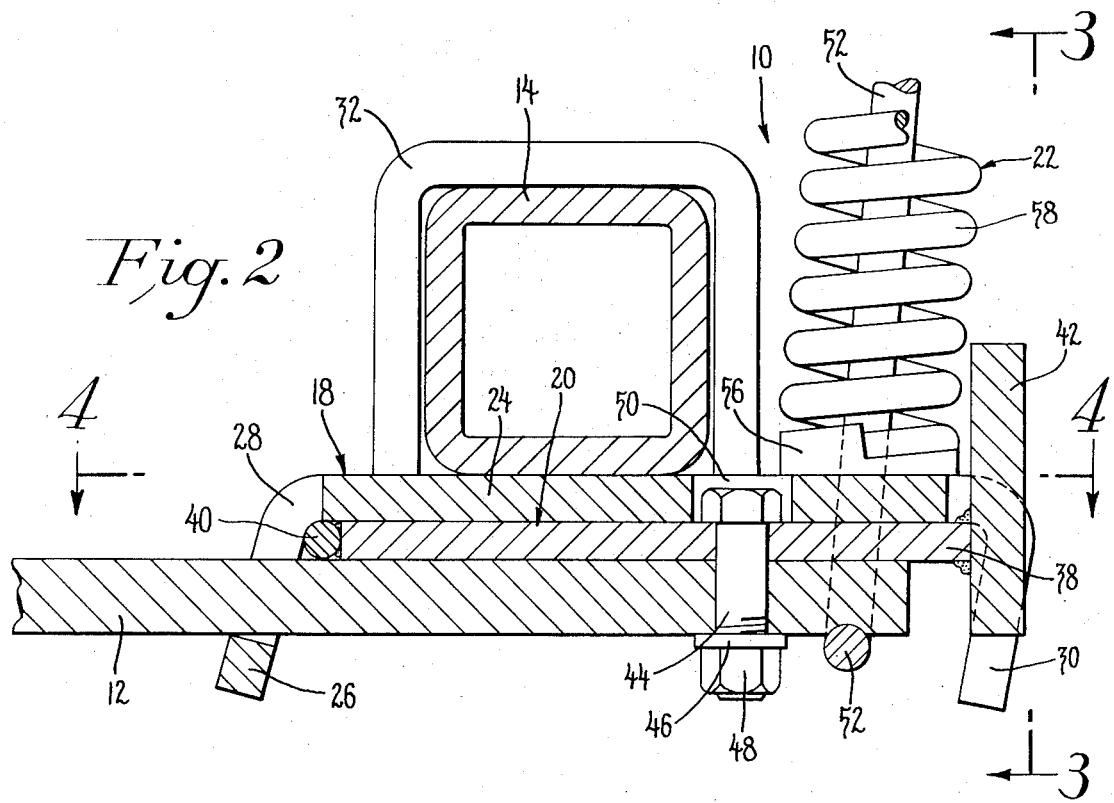
FIG. 2 is an enlarged side elevation of the spring cushion shank mounting shown in FIG. 1.
Figure 3:
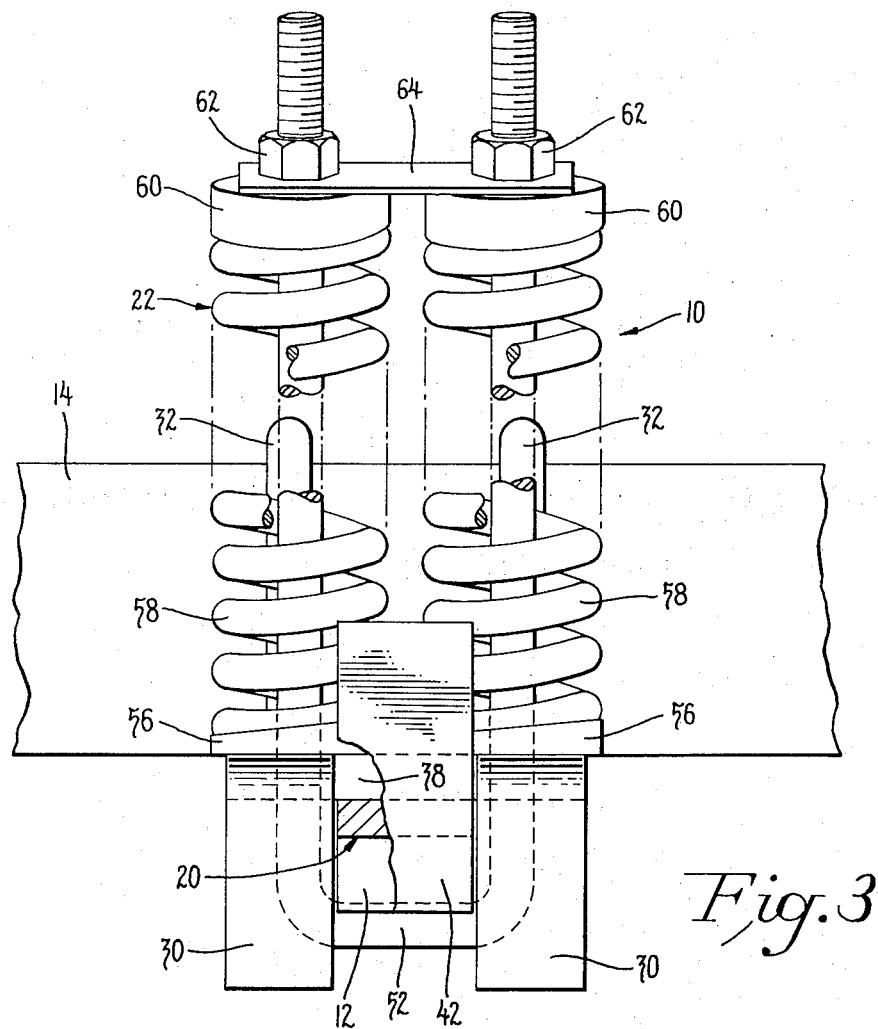
FIG. 3 is an end view of the spring cushion shank mounting taken along line 3—3 of FIG. 2.
Figure 4:
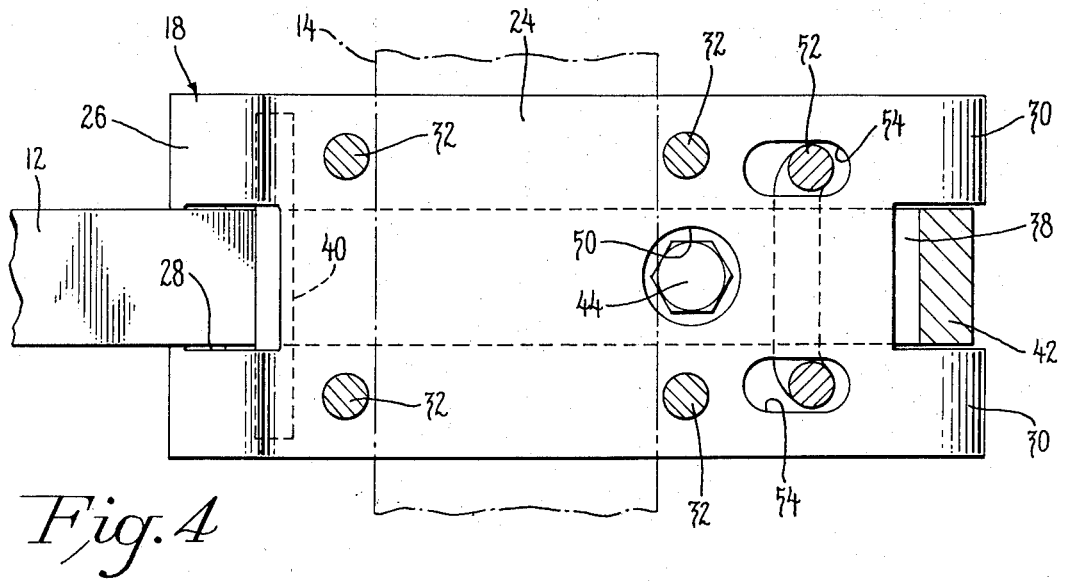
FIG. 4 is a sectional view taken along line 4—4 of FIG. 2.

The sides of the rectangular aperture 28 in the bed bracket 18 limit movement of the shank 12 from side to side. Movement of the shank 12 from side to side is also limited by the elongated guide 42 in the slot formed by the transversely spaced depending front flanges 30. The forward end of the shank 12 and the shank support 20 are urged up toward the center section 24 of the bed bracket 18 by the spring assembly 22. The shank 12 and the rear portion of the shank support assembly 20 are held up and adjacent to the center section 24 of the bed bracket 18 by the portion of the transversely extending rear flange 26 of the bed bracket 18 that passes under the shank 12 when in the position shown in FIG. 2.

Application of a sufficient force F to the earthworking tool 16 to overcome the spring assembly 22 will cause the shank 12 and the shank support assembly 36 to pivot about the axis of the arcuate rear section 40 of the shank support assembly 20. As the shank pivots about the axis of the arcuate rear section 40 of the shank support assembly 20, the elongated guide 42 between the transversely spaced depending front flanges 30, will resist all but substantially vertical movement as the compression springs 58 approach the fully compressed condition. In the fully compressed position illustrated by the broken line portion of FIG. 1, the elongated guide is still in the slot between the depending front flanges 30. Thus it can be seen that the elongated guide 42 in the slot formed by the two transversely spaced depending front flanges 30 holds the shank 12 from moving as well as a shank held by an expensive machined pivot pin.

We claim:

1. A spring cushion shank mounting assembly for securing an earthworking tool to the frame of an earthworking implement characterized by a bed bracket with a center section adapted to be attached to an implement frame, a transversely extending depending rear flange with an aperture, and a pair of transversely spaced depending front flanges; a shank support including an elongated center section positioned adjacent to the lower surface of the center section of the bed bracket, an arcuate rear section in contact with the transversely extending depending rear flange at each side of the aperture, and an elongated guide member attached to the forward portion of the elongated center section of the shank support at substantially a right angle to the elongated center section of the shank support and positioned between the transversely spaced depending front flanges of the bed bracket and extending substantially from one flange to the other thereby limiting the elongated guide member to vertical movement relative to the bed bracket; a shank extending through the aperture in the transversely extending depending rear flange of the bed bracket; connecting means for connecting the shank to the shank support; and resilient means for biasing the forward end of the shank support toward the center section of the bed bracket.

* * * * *